United States Patent
Son et al.

(10) Patent No.: US 10,111,567 B2
(45) Date of Patent: Oct. 30, 2018

(54) VACUUM CLEANER AND METHOD OF DISPLAYING STATE THEREOF

(71) Applicant: LG ELECTRONICS INC., Seoul (KR)

(72) Inventors: Jungkyu Son, Seoul (KR); Bohyun Nam, Seoul (KR); Jaeyong Park, Seoul (KR); Sehwan Bae, Seoul (KR)

(73) Assignee: LG Electronics Inc., Seoul (KR)

( * ) Notice: Subject to any disclaimer, the term of this patent is extended or adjusted under 35 U.S.C. 154(b) by 33 days.

(21) Appl. No.: 15/444,770

(22) Filed: Feb. 28, 2017

(65) Prior Publication Data

US 2017/0245715 A1  Aug. 31, 2017

(30) Foreign Application Priority Data

Feb. 29, 2016 (KR) .................. 10-2016-0024022
Mar. 25, 2016 (KR) .................. 10-2016-0036257

(51) Int. Cl.
*A47L 9/28* (2006.01)
*A47L 5/36* (2006.01)

(52) U.S. Cl.
CPC ............. *A47L 9/2857* (2013.01); *A47L 5/362* (2013.01); *A47L 9/2805* (2013.01);
(Continued)

(58) Field of Classification Search
CPC .... A47L 9/2857; A47L 9/2805; A47L 9/2852; A47L 9/2884; A47L 5/362; A47L 2201/04
See application file for complete search history.

(56) References Cited

U.S. PATENT DOCUMENTS 2,811,737 A  11/1957 Hayba
5,392,200 A  2/1995 Milde
(Continued)

FOREIGN PATENT DOCUMENTS

DE  102012107689  9/2013
EP  2700345  2/2014
(Continued)

OTHER PUBLICATIONS

'it.donga.com' [online]. "Shift in generations of leisure goods unicycle electric scooter 'Ninebot One,'" Mar. 2015, 24 pages (with English translation).
(Continued)

*Primary Examiner* — Dung Van Nguyen
(74) *Attorney, Agent, or Firm* — Fish & Richardson P.C.

(57) ABSTRACT

A vacuum cleaner that includes: a suction part that is configured to receive dust; and a cleaner body that is coupled to the suction part, that is configured to collect dust from the suction part based on suction force, and that includes: a main body, a suction motor that is configured to generate suction force, a wheel that is coupled to a first surface of the main body and that is configured to rotate about an axis to move the main body, a driving unit that is configured to generate driving force to move the wheel, a display unit that is coupled to the wheel and that is configured to display operation state information of the vacuum cleaner, and a controller that is configured to control the driving unit and the display unit is disclosed.

20 Claims, 11 Drawing Sheets

(52) U.S. Cl.
CPC .......... *A47L 9/2852* (2013.01); *A47L 9/2884* (2013.01); *A47L 2201/04* (2013.01)

(56) References Cited

U.S. PATENT DOCUMENTS

| | | | |
|---|---|---|---|
| 6,030,106 A * | 2/2000 | Johnson | A63C 17/26 362/464 |
| 6,851,817 B2 * | 2/2005 | Wong | A43B 1/0036 280/11.203 |
| 9,655,489 B2 * | 5/2017 | Ha | A47L 9/2873 |
| 2010/0132149 A1 | 6/2010 | Jeong et al. | |
| 2016/0235268 A1 | 8/2016 | Choi et al. | |

FOREIGN PATENT DOCUMENTS

| | | |
|---|---|---|
| JP | 2000033060 | 2/2000 |
| JP | 2015096132 | 5/2015 |
| KR | 0702733 | 4/2007 |
| KR | 20080017649 | 2/2008 |
| KR | 0876695 | 12/2008 |
| KR | 20150033554 | 4/2015 |
| KR | 101542895 | 8/2015 |
| KR | 1552437 | 9/2015 |
| WO | 2008117945 | 10/2008 |

OTHER PUBLICATIONS

Extended European Search Report in European Application No. 17157679.6, dated Jul. 26, 2017, 8 pages (with English translation).

* cited by examiner (a)

(b)

VACUUM CLEANER AND METHOD OF DISPLAYING STATE THEREOF

CROSS-REFERENCE TO RELATED APPLICATIONS

This application claims priority under 35 U.S.C. 119 and 365 to Korean Patent Application No. 10-2016-0024022, filed on Feb. 29, 2016 and Korean Patent Application No. 10-2016-0036257, filed on Mar. 25, 2016 in the Korean Intellectual Property Office, the entire contents of which is incorporated herein by reference.

TECHNICAL FIELD

The present invention relates to a vacuum cleaner and a method of displaying the state thereof.

BACKGROUND

In general, a vacuum cleaner refers to a device for sucking dust and foreign materials from a surface to be cleaned using a suction motor provided in a main body and filtering dust and foreign materials in the main body.

The vacuum cleaner may be classified into an up-right type vacuum cleaner having a suction nozzle connected to a main body thereof and moving along with the main body and a canister type vacuum cleaner having a suction nozzle connected to a main body through an extension pipe, a handle, a hose, etc.

As the related art, a canister type vacuum cleaner is disclosed in Korean Patent Laid-Open No. 10-2008-0017649.

The vacuum cleaner of the related art includes a main body including a fan-motor assembly for providing vacuum suction force, a suction nozzle for sucking in various indoor foreign materials, an extension pipe extending from the suction nozzle, a suction hose connected to the main body to deliver vacuum suction force, a controller provided in the main body to control operation of various components such as the fan-motor assembly, and a panel provided in the main body to display various images and information under control of the controller.

The vacuum cleaner of the related art generally displays the operation state thereof through a display unit provided in the main body. However, the method of displaying the state of the cleaner of the related art has low visibility and thus requires user's excessive concentration or efforts. Accordingly, the operation state of the cleaner or an error occurring during the operation of the cleaner may not be properly delivered to the user. In particular, if the user does not perceive the error occurring during the operation of the cleaner, the internal parts of the vacuum cleaner may be damaged or cleaning may not be properly performed.

In addition, in the vacuum cleaner of the related art, since wheels are automatically driven by a driving device such as a motor, the user may not perceive the driving state of the wheels.

As the related art, a vacuum cleaner is disclosed in Korean Patent Publication No. 10-1552437.

The vacuum cleaner of the related art includes a cleaner body including a suction motor for generating suction force, a suction part communicating with the cleaner body to suck in air and dust, a connection part for connecting the suction part and the cleaner body, and a battery provided in the cleaner body to supply power to the suction motor.

Meanwhile, in order to replace the battery or charge the battery using a charger, the battery should be detached from the cleaner body. However, in the related art, since a battery assembly is provided in the cleaner body, it is inconvenient to detach the battery assembly from the cleaner body.

SUMMARY

In general, one innovative aspect of the subject matter described in this specification can be implemented in a vacuum cleaner comprising: a suction part that is configured to receive dust; and a cleaner body that is coupled to the suction part, that is configured to collect dust from the suction part based on suction force, and that includes: a main body, a suction motor that is configured to generate suction force, a wheel that is coupled to a first surface of the main body and that is configured to rotate about an axis to move the main body, a driving unit that is configured to generate driving force to move the wheel, a display unit that is coupled to the wheel and that is configured to display operation state information of the vacuum cleaner, and a controller that is configured to control the driving unit and the display unit.

The foregoing and other implementations can each optionally include one or more of the following features, alone or in combination. In particular, one implementation includes all the following features in combination. The vacuum cleaner further includes: a first sensor that is configured to sense movement of the main body, wherein the controller is configured to control a rotation of the wheel based on the movement of the main body sensed by the first sensor. The controller is configured to: control the display unit to display power status of the first sensor. The controller is configured to: control the display unit to display a rotation direction of the wheel. The display unit includes: a light emitting unit that is configured to emit light, and wherein the controller is configured to: define a first region of the light emitting unit and control the first region of the light emitting unit to emit first light in a first color, and define a second region of the light emitting unit and control the second region of the light emitting unit to emit second light in a second color. The light emitting unit has a circular shape or a ring shape, and wherein the controller is configured to: define the first region to move along a perimeter of the light emitting unit based on a rotation of the wheel. The controller is configured to: determine whether the vacuum cleaner has an operation error, and based on a determination that the vacuum cleaner has an operation error, control the display unit to display the operation error. The vacuum cleaner further includes: a second sensor that is configured to sense an obstacle, wherein the controller is configured to control the display unit to display obstacle information indicating that an obstacle is present adjacent to the vacuum cleaner. The vacuum cleaner further includes: a battery that is configured to supply electric power to the main body, wherein the controller is configured to control the display unit to display battery level information including a remaining capacity of the battery. The battery is detachable to the main body. The cleaner body includes: a first portion located at a first side of the axis, and a second portion located at a second side of the axis, wherein the battery is detachable from the second portion of the cleaner body, and wherein, based on the battery being detached from the second portion, the second portion is heavier than the first portion. Based on the battery being detached from the second portion, the first portion is lifted from ground. At least a portion of the battery is closer to ground than the axis. The main body includes: a battery attachment part that is part of the second portion and to which the battery is attached, and wherein the battery is attached to the battery attachment part at a first angle relative to ground, the first angle being between 0 and 90 degrees. The vacuum cleaner further includes: a third sensor that is configured to sense movement of the cleaner body, wherein, based on movement of the cleaner body, the controller is configured to control the driving unit to move the wheel such that the cleaner body follows a user. The vacuum cleaner further includes: a supporter that is coupled to a surface of the main body, wherein the main body is configured to rotate about the axis based on the battery being detached from the second portion, and wherein the supporter is configured to block the main body from rotating beyond a second angle. The supporter includes: an auxiliary wheel that is configured to rotate with the wheel. The supporter includes: an extension that couples the auxiliary wheel to the main body. The supporter includes: an elastic member that is configured to provide elastic force to the extension.

In general, another innovative aspect of the subject matter described in this specification can be implemented in a method of displaying operation state information of a vacuum cleaner that includes a main body, a wheel that is coupled to a first surface of the main body and that is configured to rotate to move the main body, a driving unit that is configured to generate driving force to move the wheel, a display unit that is coupled to the wheel and that is configured to display operation state information of the vacuum cleaner, a controller that is configured to control the driving unit and the display unit, and a sensor that is configured to sense movement of the main body, the method comprising: initiating, by the controller, an operation of the sensor; sensing, by the sensor, movement of the main body; controlling, by the controller, the driving unit to move the wheel to move the main body; and controlling, by the controller, the display unit to display a rotation direction of the wheel.

The subject matter described in this specification can be implemented in particular examples so as to realize one or more of the following advantages. An advantage of the present invention is to provide a vacuum cleaner including a display unit for enabling a user to easily check the operation state of the vacuum cleaner.

Another advantage of the present invention is to provide a vacuum cleaner capable of displaying the rotation direction of wheels to a user when the wheels of the vacuum cleaner are automatically driven.

Another advantage of the present invention is to provide a vacuum cleaner capable of easily mounting a battery in a cleaner body thereof.

Another advantage of the present invention is to provide a vacuum cleaner in which a cleaner body is two-point supported by wheels.

Another advantage of the present invention is to provide a vacuum cleaner capable of improving driving stability of a cleaner body thereof.

Another advantage of the present invention is to provide a vacuum cleaner for preventing a cleaner body thereof from being overturned backward.

The details of one or more examples of the subject matter described in this specification are set forth in the accompanying drawings and the description below. Other potential features, aspects, and advantages of the subject matter will become apparent from the description, the drawings, and the claim.

DETAILED DESCRIPTION

Figure 1:
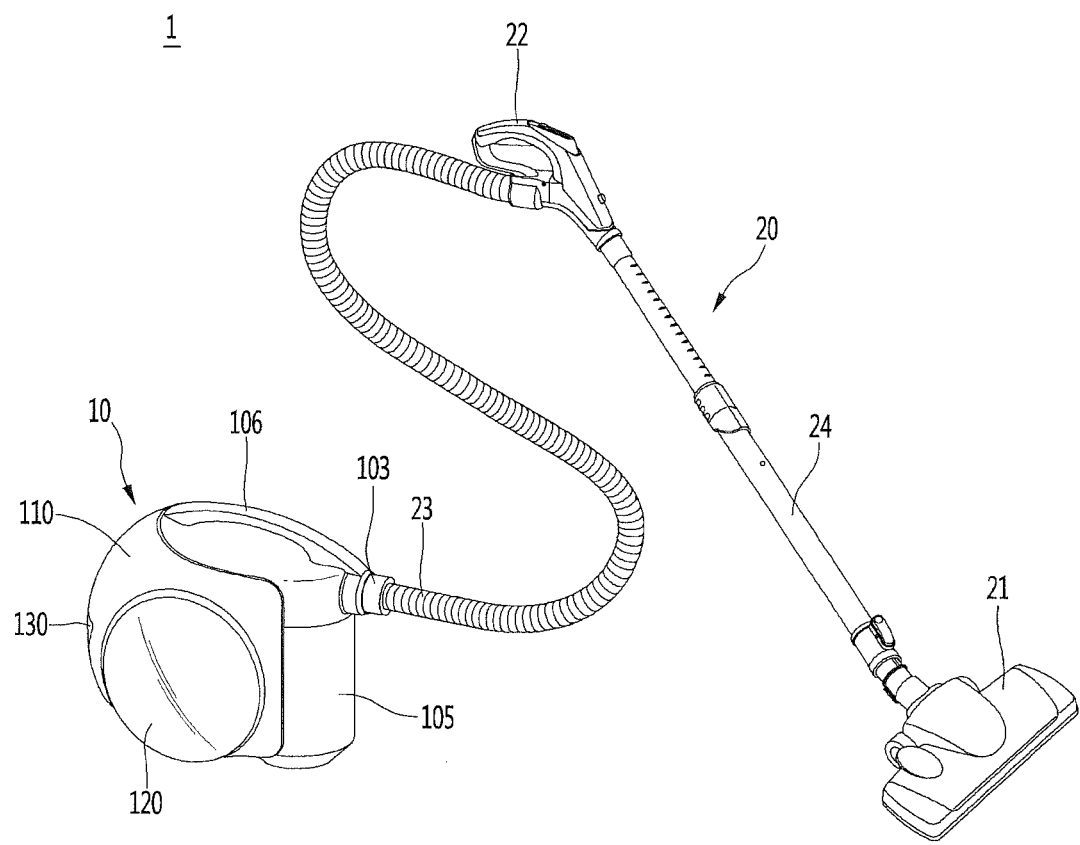
FIG. 1 is a perspective view of a vacuum cleaner according to an embodiment of the present invention.

Hereinafter, the embodiments of the present invention will be described in detail with reference to the accompanying drawings, in which the same or similar portions are denoted by the same reference numerals. In describing the present invention, a detailed description of known functions and configurations will be omitted when it may obscure the subject matter of the present invention.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessing" another element, one element may be "connected to", "coupled to", or "access" another element via a further element although one element may be directly connected to or directly access another element.

Figure 2:
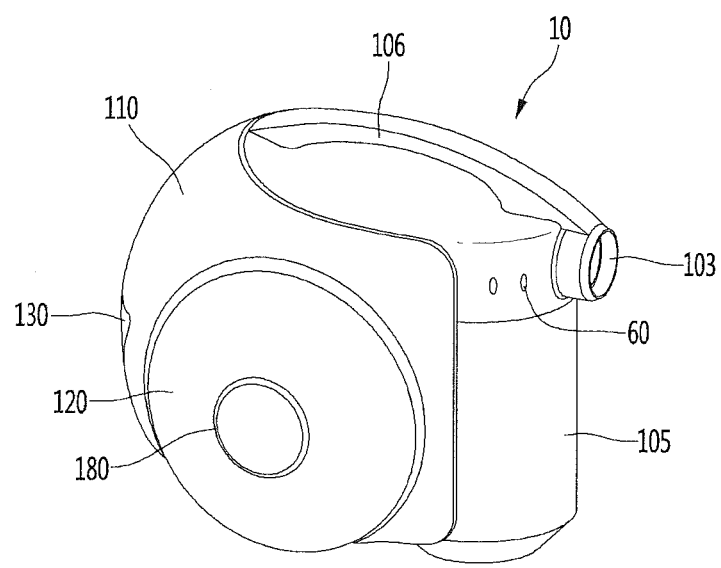
FIG. 2 is a perspective view of a cleaner body of FIG. 1.
Figure 3:
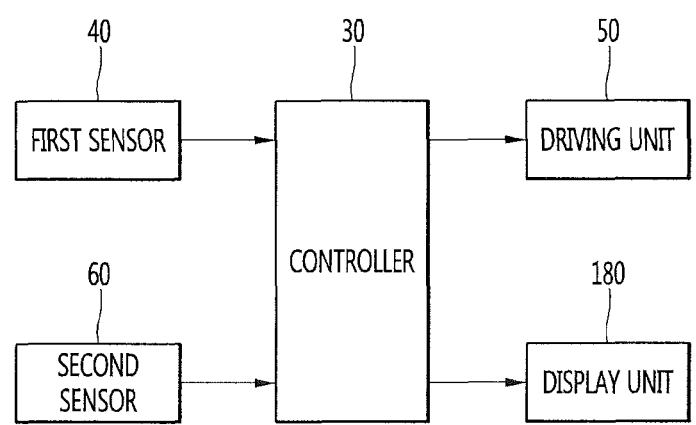
FIG. 3 is a block diagram of a vacuum cleaner according to an embodiment of the present invention.

FIG. 1 is a perspective view of a vacuum cleaner according to an embodiment of the present invention, FIG. 2 is a perspective view of a cleaner body of FIG. 1, and FIG. 3 is a block diagram of a vacuum cleaner according to an embodiment of the present invention.

Referring to FIGS. 1 to 3, the vacuum cleaner 1 according to the embodiment of the present invention includes a cleaner body 10 and a suction device 20. The cleaner body 10 includes a suction motor for generating suction force. When the suction motor is driven to generate suction force, the suction device 20 may guide air including dust to the cleaner body 10.

The suction device 20 may include a suction part 21 for sucking dust from a surface to be cleaned, e.g., a floor, and connection parts 22, 23 and 24 for connecting the suction part 21 to the cleaner body 10. The connection parts 22, 23 and 24 may include an extension pipe 24 connected to the suction part 21, a handle 22 connected to the extension pipe 24 and a suction hose 23 for connecting the handle 22 to the cleaner body 10.

The cleaner body 10 includes a main body 110 and wheels 120.

The main body 110 may include the suction motor and various parts and electronic parts for driving the vacuum cleaner 1.

The cleaner body 10 may include a connector 103 connected to the suction hose 23. Dust received through the suction hose 23 may flow into the main body 110 through the connector 103.

The main body 110 includes a dust canister 105 in which dust sucked through the suction device 20 is stored. The dust canister 105 may be detachably mounted in the main body 110. In addition, the dust canister 105 may be provided in front of the main body 110 and may be made of a transparent material to enable a user to view the inside of the dust canister.

The vacuum cleaner 1 may include a dust separator (not shown) for separating air and dust sucked by the suction device 20. The dust separator may be provided separately from or integrally with the dust canister 105.

The main body 110 may include a grip part 106 gripped by the user. The user may grip the grip part 106 in order to lift up or incline the main body 110.

The battery 130 may be detachably coupled to the main body 110. The battery 130 may be responsible for supplying power necessary to drive the vacuum cleaner 1. The battery 130 may be a secondary battery which may be charged or discharged. The battery 130 may be connected with a power cord (not shown) for supplying commercial power.

The wheels 120 may be rotatably coupled to the main body 110.

The wheels 120 may form a pair and the wheels 120 may be coupled to both sides of the main body 110.

The wheels 120 may rotate by a driving unit 50. The driving unit 50 may include a motor, etc. When a voltage is applied to the driving unit 50, power may be generated in the driving unit 50 and delivered to the wheels 120.

The wheels 120 may cover over half the side surface of the main body 110 as shown in the figure. As the size of the wheels 120 increases, the cleaner body can more easily pass an obstacle.

The vacuum cleaner 1 may include a controller 30. The controller 30 may control overall driving of the vacuum cleaner 1 including the driving unit 50.

The cleaner body 10 may further include a first sensor 40 for sensing motion of the cleaner body 10.

As the first sensor 40, a gyro sensor for sensing a current angle and a current speed of the cleaner body 10 upon operating the cleaner body 10 may be used.

The gyro sensor senses angular velocity from the Coriolis force applied in a direction perpendicular to a direction in which a moving object rotates and may measure not only the angle of the moving object but also change in position of the moving object from a first reference point.

The controller 30 may control the driving unit 50 such that the main body 110 automatically follows motion of the user based on the sensed information of the first sensor 40.

When the first sensor 40 is turned on, the controller 30 may control the driving unit 50 such that the center of gravity of the main body 110 is located on the vertical line passing the rotation center of the wheels 120. That is, the main body 110 is subjected to inverted pendulum control, which is referred to as self-balancing control in this specification. For self-balancing control, the first sensor 40 may sense the speed of the rotation center of the main body 110.

Upon self-balancing control, the controller 30 may perform control to move the wheels 120 such that the main body 110 falls. At this time, the bottom of the main body 110 may be spaced apart from the floor.

When the first sensor 40 is in OFF state, self-balancing control may be finished. That is, self-balancing control may start when the first sensor 40 is turned on and may finish when the first sensor 40 is turned off.

The vacuum cleaner 1 may further include a second sensor 60 for sensing an obstacle.

The second sensor 60 senses an obstacle located near the moving route of the main body 110. For example, the second sensor 60 may include an ultrasonic sensor, a laser sensor, an infrared sensor, etc. Information sensed by the second sensor 60 may be delivered to the controller 30. The second sensor 60 may be referred to as an obstacle sensor.

The vacuum cleaner 1 may further include a display unit 180 for displaying the state of the vacuum cleaner 1. The display unit 180 may be provided on the wheel 120. Thus, the display unit 180 may rotate along with the wheel 120. If a pair of wheels 120 is provided, the display unit 180 may be provided in each wheel 120.

Hereinafter, a method of displaying the state of the vacuum cleaner 1 through the display unit 180 will be described in detail.

Figure 4:
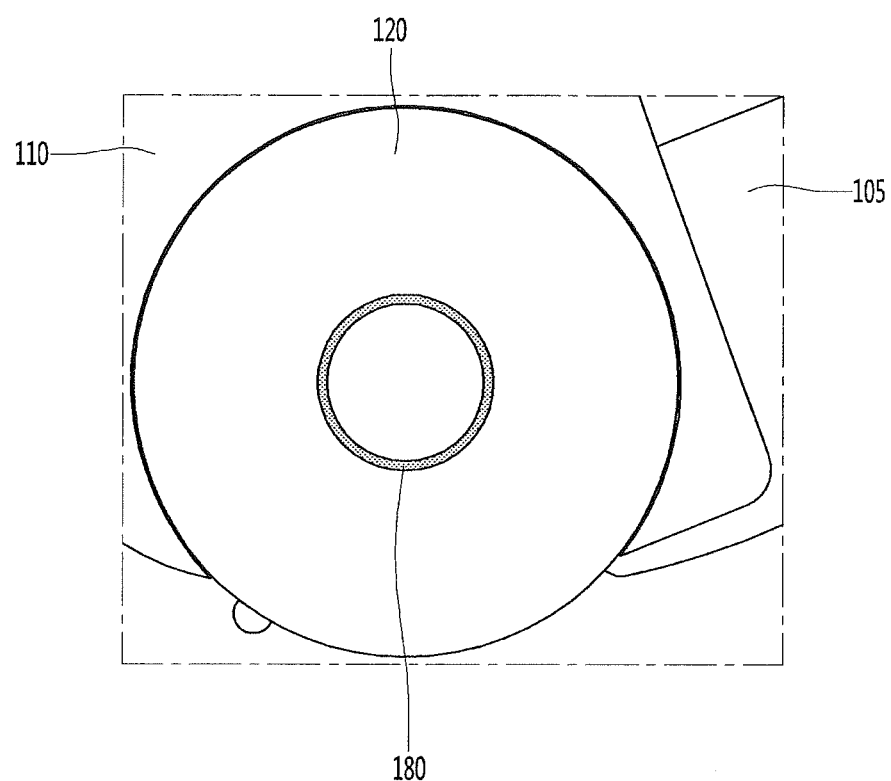
FIG. 4 is a view showing a state of turning a display unit off.
Figure 5:
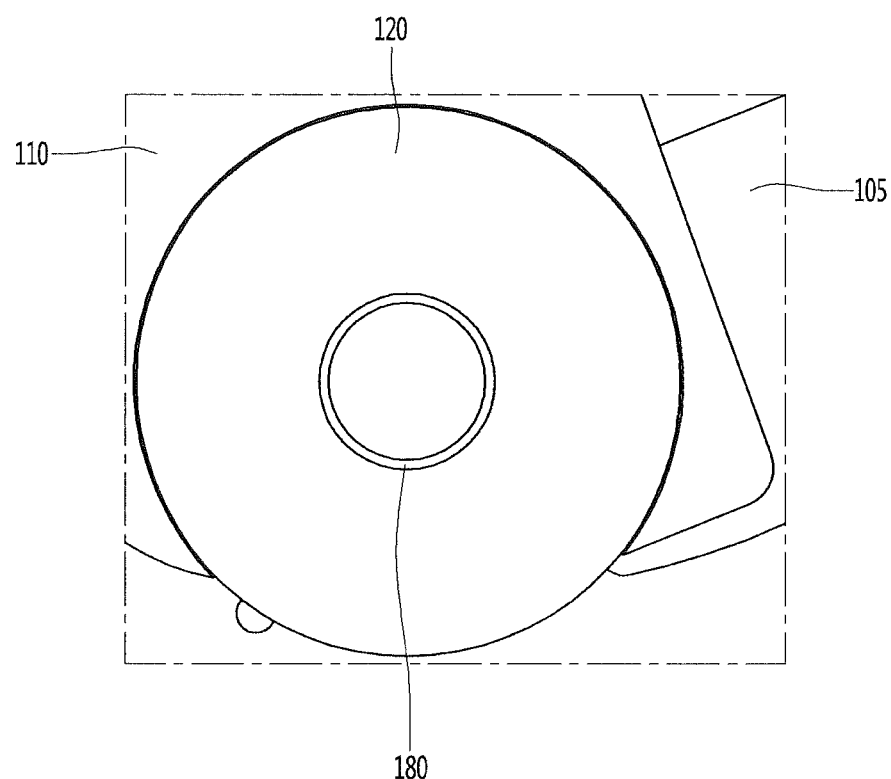
FIG. 5 is a view showing a state in which a display unit emits light.

FIG. 4 is a view showing a state of turning a display unit off, and FIG. 5 is a view showing a state in which a display unit emits light.

Referring to FIGS. 4 and 5, the display unit 180 may include a light emitting unit for emitting light. The light emitting unit of the display unit 180 may be turned on/off, flickered or dimmed. In addition, the color of light emitted from the display unit 180 may be changed. The state of the vacuum cleaner 1 may be displayed using a pattern of light emitted from the display unit 180. Light emitted from the display unit 180 may be controlled by the controller 30.

The display unit 180 may have a circular, concentric or ring shape around the rotation center of the wheel 120. That is, the outer circumference of the display unit 180 forms a circle around the rotation center of the wheel 120.

The center of the display unit 180 matches the rotation center of the wheel 120, the shape of the display unit 180 when the wheel 120 is stationary and the afterimage of the display unit 180 formed when the wheel 120 rotates are similarly perceived.

Unlike the figure, the display unit 180 may have various shapes. For example, the display unit 180 may have an elliptical, rectangular or triangular shape.

A plurality of LEDs may be provided according to the shape of the display unit 180.

The color of light emitted from the display unit 180 may include white, red, green, blue, etc. as shown in the figure and the color of light may be divided into a first color, a second color and a third color.

The display unit 180 may display whether the self-balancing control function of the vacuum cleaner 1 is performed.

More specifically, while the self-balancing control function is performed, the display unit 180 may continuously emit light of the first color. Meanwhile, when the self-balancing control function starts, the display unit 180 may control flickering of light of the first color in order to notify the user that the self-balancing control function starts.

As described above, self-balancing control may be performed according to ON/OFF of the first sensor 40. Accordingly, the controller 30 may perform control such that the display unit 180 emits light of the first color when the first sensor 40 is turned on and the display unit 180 is turned off when the first sensor 40 is turned off.

In addition, the display unit 180 may perform display to notify the user of an obstacle when the obstacle is sensed near the moving route of the main body 110.

More specifically, when the second sensor 60 senses the obstacle near the moving route of the main body 110, the controller 30 may perform control such that light of the second color emitted from the display unit 180 flickers once.

The display unit 180 may display lack of the remaining capacity of battery 130 or an error occurring upon operating the vacuum cleaner 1.

More specifically, when lack of the remaining capacity of the battery 130 is sensed, the controller 30 may perform control such that light of the second color emitted from the display unit 180 flickers twice. In addition, when an error occurring upon operating the vacuum cleaner 1 is sensed, the controller 30 may perform control such that light of the third color emitted from the display unit 180 flickers.

Figure 6:
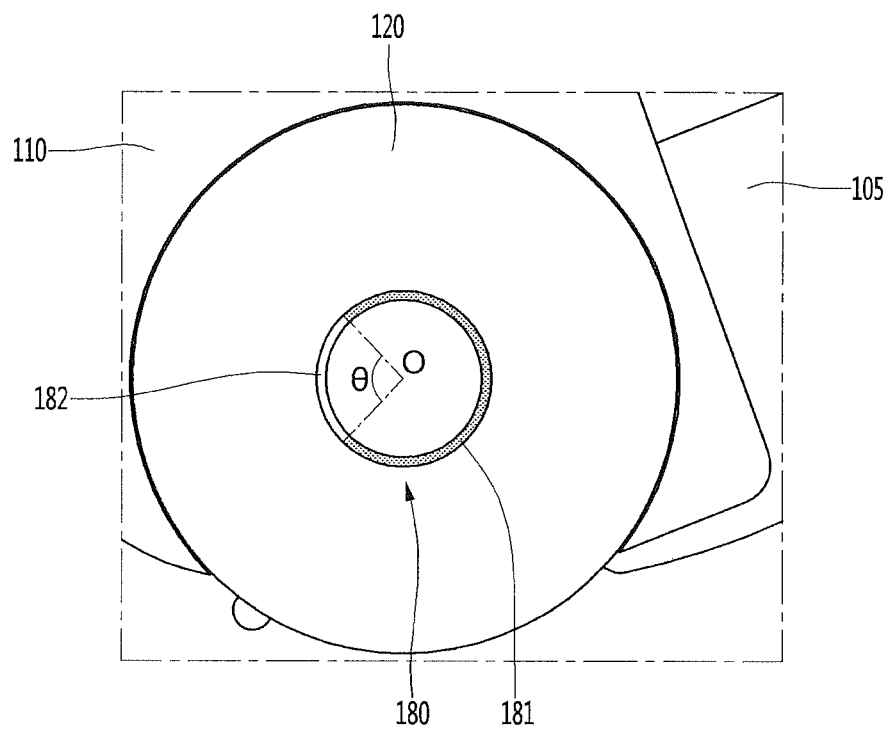
FIG. 6 is a view showing a state in which only a portion of a display unit emits light.

FIG. 6 is a view showing a state in which only a portion of a display unit emits light. Referring to FIG. 6, the display unit 180 may perform control to emit light in a second region 182 and not to emit light in a first region 181.

The display unit 180 may include a plurality of LEDs arranged in a circular shape. Only some of the plurality of LEDs may be turned on to form the second region 182 and the other LEDs are turned off to form the first region 181.

The second region 182 has an arc shape having a central angle θ with respect to the center O of a circle formed by the display unit 180, that is, the rotation center of the wheel 120. If the display unit 180 has a circular shape, the second region 182 has a fan shape having a central angle θ with respect to the rotation center of the wheel 120.

The angle θ of the second region 182 may be controlled by the controller 30. A portion other than a portion occupied by the second region 182 in the display unit 180 corresponds to the first region 181 and the first region 181 may have an arc shape like the second region 182. The angle θ of the second region 182 may be less than that of the first region 181 without being limited thereto.

When the wheel 120 rotates, the display unit 180 rotates and thus the second region 182 rotates while drawing a circle. Therefore, the user may perceive the rotation direction of the second region 182 and, as a result, check the rotation direction of the wheel 120.

Accordingly, upon self-balancing control, the user may perceive the rotation direction of the wheel 120 through rotation of the second region 182.

In addition, in order for the display unit 180 to display the remaining capacity of the battery 130, a ratio of the second region 182 to the first region 181 may be controlled according to the remaining capacity of the battery 130. For example, the central angle θ of the second region 182 may be 180° if the remaining capacity of the battery 130 is 50% and may be 120° if the remaining capacity of the battery 130 is 30%.

In addition, in order to display the rotation direction of the wheel 120, the position of the second region 182 may be controlled to rotate around the rotation center of the wheel 120.

At this time, the controller 30 may perform control such that LEDs for emitting light among the plurality of LEDs provided on the display unit 180 are continuously changed.

Meanwhile, a plurality of second regions 182 may be provided. That is, the first region 181 may be provided between the plurality of second regions 182. Even in this case, the user may perceive the rotation direction of the second region 182 and thus check the rotation direction of the wheel 110.

The vacuum cleaner 1 according to the present invention include the above-described wheel 120 to display the operation state information of the vacuum cleaner 1. The user may check the rotation direction of the wheel 120 through rotation of the display unit 180.

Figure 7:
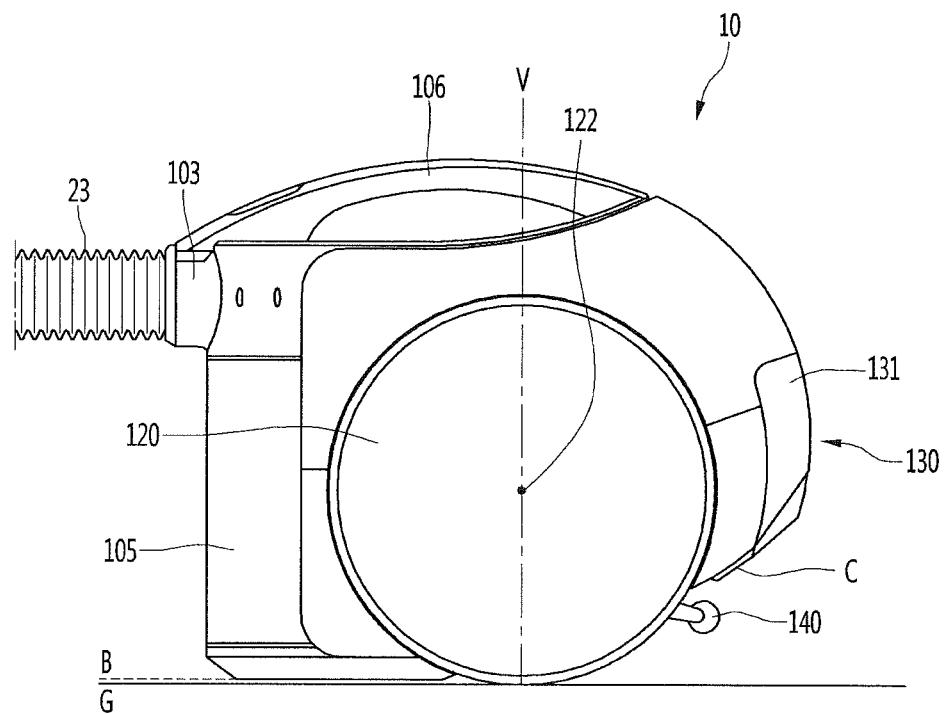
FIG. 7 is a view showing a state in which a main body of FIG. 1 is inclined forward.
Figure 8:
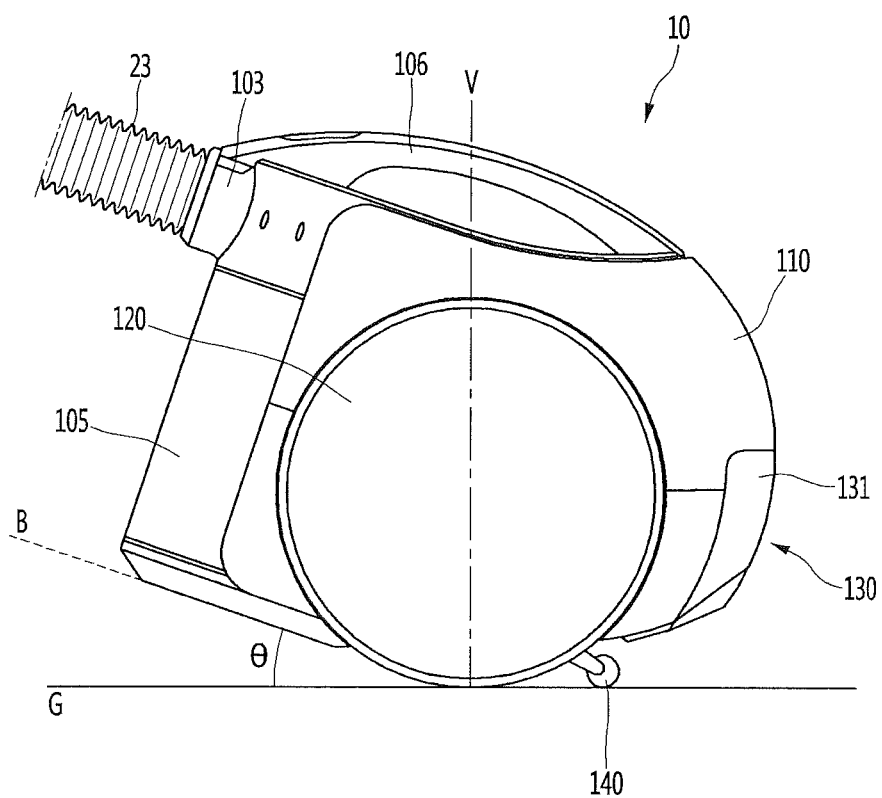
FIG. 8 is a view showing a state in which the main body of FIG. 1 is inclined backward.
Figure 9:
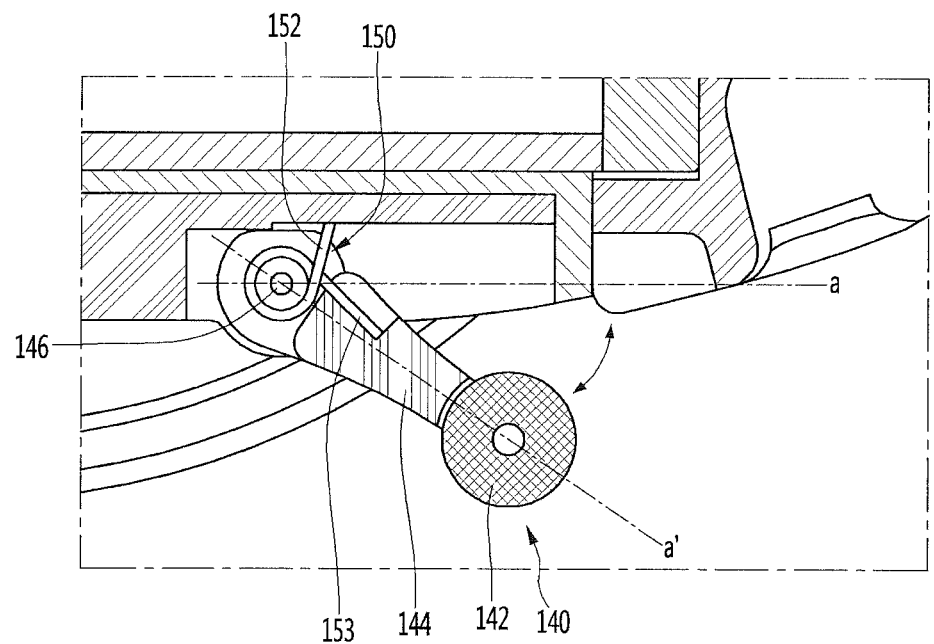
FIG. 9 is a view showing the configuration of a supporter of FIG. 8.

FIG. 7 is a view showing a state in which a cleaner body of FIG. 1 is inclined forward, FIG. 8 is a view showing a state in which the cleaner body of FIG. 1 is inclined backward, and FIG. 9 is a view showing the configuration of a supporter of FIG. 8.

Referring to FIGS. 7 to 9, at least a part of the bottom of the main body 110 is separated from a floor. Thus, the main body 110 may rotate to the front side or the back side of the wheels 120.

A part, in which the connector 103 is provided, of the cleaner body 10 with respect to a vertical line passing through a rotation center of the wheels 120 may be defined as a front side and a part, in which the battery 130 is provided, may be defined as a back side. In addition, the main body 110 rotating forward means that the main body 110 rotates in a counter-clockwise direction (see FIG. 7) in the figure and the main body 110 rotating backward means that the main body 110 rotates in a clockwise direction (see FIG. 8).

Referring to FIG. 3, the cleaner body 10 may further include a driving unit 50 for driving the wheels 120.

The driving unit 50 may be automatically controlled by a controller 30, such that the wheels 120 may be automatically driven along a direction desired by the user. That is, the controller 30 may perform control such that the cleaner body 10 automatically follows motion of the user.

The cleaner body 10 may further include a sensor 40 for sensing motion of the cleaner body 10. The controller 30 may control driving of the wheels 120 by information sensed by the sensor 40.

As the sensor 40, a gyro sensor for sensing a current angle and a current speed of the cleaner body upon operating the cleaner body 10 may be used.

The gyro sensor senses angular velocity from the Coriolis force applied in a direction perpendicular to a direction in which a moving object rotates and may measure not only the angle of the moving object but also change in position of the moving object from a first reference point.

The controller 30 may control the driving unit 50 such that the main body 110 automatically follows motion of the user based on the sensed information of the sensor 40.

If the sensor 40 is turned off, the wheels 120 may not be driven. In this case, the cleaner body 10 is inclined according to the position of the center of gravity thereof. For example, when the center of gravity of the cleaner body 10 is located at the front side of the vertical line V passing through the rotation center 122 of the wheels 120, the cleaner body 10 is inclined forward as shown in FIG. 7 and, when the center of gravity of the cleaner body 10 is located at the back side of the vertical line V, the cleaner body 10 is inclined backward as shown in FIG. 8.

The cleaner body 10 may include a first bottom B and a second bottom C. The second bottom C extends at a predetermined angle with respect to the first bottom B.

In the state shown in FIG. 7, the first bottom B is substantially aligned with the floor G. In contrast, the second bottom C is separated from the floor G and is inclined at a predetermined angle with respect to the floor G.

When the sensor 40 is turned on, the controller 30 may control driving of the wheels 120 such that the center of gravity of the cleaner body 10 is located on the vertical line V passing through the rotation center 122 of the wheels 120.

In this case, as shown in FIG. 8, the first bottom B of the cleaner body 10 may be separated from the floor G.

The cleaner body 10 may further include a supporter 140. The supporter 140 may extend from the second bottom C of the cleaner body 10. The supporter 140 may perform a function for restricting the angle of the cleaner body 10 inclined backward.

The supporter 140 may include an auxiliary wheel 142. The auxiliary wheel 142 may rotate by friction with the floor G. Therefore, the cleaner body 10 may be smoothly driven.

The supporter 140 may further include an extension 144. The auxiliary wheel 142 may be rotatably connected to one side of the extension 144.

The supporter 140 may further include a rotation shaft 146. The other side of the extension 144 may be rotatably connected to the main body 110 by the rotation shaft 146.

The extension 144 may rotate within a predetermined range. More specifically, the extension 144 may rotate upward or downward within a range of a to a'. The main body 110 may include a stopper (not shown) for restricting the rotation range of the extension 144.

The supporter 140 may further include an elastic member 150. For example, the elastic member 150 may be a torsion spring.

One end 152 of the elastic member 150 may be supported by the main body 110 and the other end 153 of the elastic member 150 may be supported by the extension 144. The elastic member 150 may apply elastic force such that the extension 144 rotates in a clockwise direction in the figure.

When the main body 110 is inclined forward to the maximum extent, the front part of the bottom B of the main body 110 may contact the floor G. Thus, the maximum angle of the main body 110 rotated forward may be restricted.

In contrast, when the main body 110 is inclined backward, the supporter 140 may contact the floor G. Thus, the maximum angle of the main body 110 rotated backward may be restricted. Therefore, it is possible to prevent the main body 110 from being overturned forward or backward.

Since elastic force of the elastic member 150 is applied to the extension 140 in a clockwise direction (see FIG. 9) in the figure, when the main body 110 is excessively inclined backward, forward rotation force may be applied to the main body 110 by the supporter 140.

When the main body 110 rotates backward to the maximum extent, the bottom B of the main body 110 forms a predetermined angle θ with respect to the floor G. At this time, the angle θ between the bottom B of the main body 110 and the floor G may be about 17° to 20°.

The battery 130 may include a cover 131. In a state in which the battery 130 is mounted in the main body 110, the cover 131 may be exposed. Thus, the cover 131 may form at least a part of the appearance of the main body 110. In addition, the user may detach the battery 130 from the main body 110 or attach the battery to the main body 110 without disassembling the main body 110. The cover 131 may include a grip part (not shown) facilitating attachment and detachment of the battery 130 to and from the main body 110.

Hereinafter, a process of attaching and detaching the battery 130 to and from the main body 110 will be described in detail. Hereinafter, assume that the center of gravity of the main body 110 is located at the front side of the main body 110 when the battery 130 is detached from the main body 110 and is located at the back side of the main body 110 when the battery 130 is attached to the main body 110.

Figure 10:
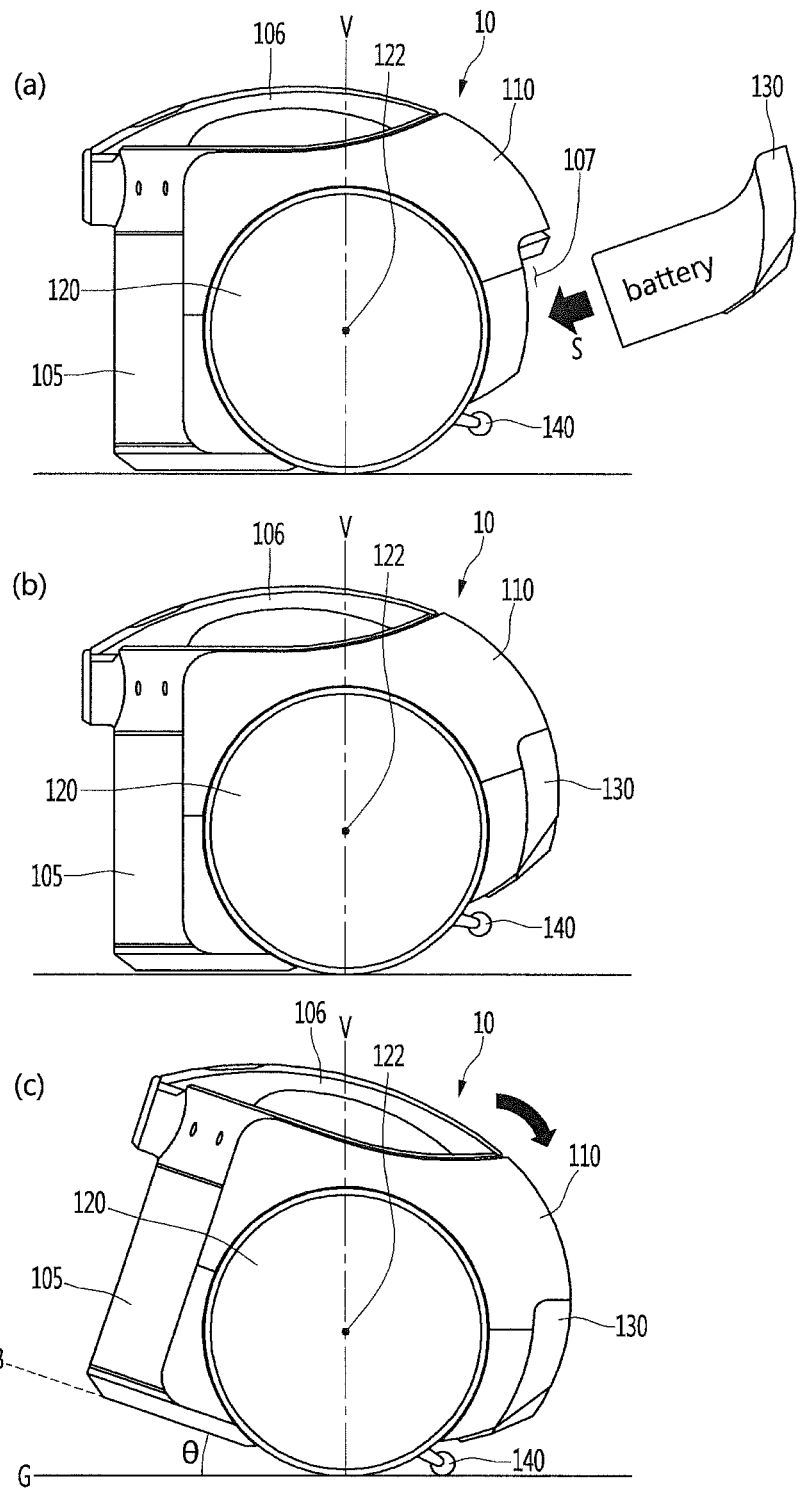
FIG. 10 is a view sequentially showing a state of attaching a battery to the main body of the cleaner.

FIG. 10 is a view sequentially showing a state of attaching a battery to the cleaner body of the cleaner.

(a) of FIG. 10 shows a state in which the battery 130 is detached from the main body 110, (b) of FIG. 10 shows a state in which the battery 130 is attached to the main body 110, and (c) of FIG. 10 shows a state in which the main body 110 is inclined backward.

A battery attachment part 107 coupled with the battery 130 is formed in the main body 110. The battery attachment part 107 may be a recess formed in the main body 110. In addition, an attachment guide (not shown) for guiding attachment of the battery 130 may be formed in the battery attachment part 107.

The battery attachment part 107 is formed at the lower side of the main body 110 and thus the battery 130 is attached to the lower side of the main body 110. The center of gravity of the battery 130 may be located at the lower side of the rotation center of the wheels 120 in a state in which the battery 130 is mounted in the main body 110.

Accordingly, when the battery 130 is attached to the main body 110, the center of gravity of the main body 110 may be moved downward, it is possible to improve driving stability of the cleaner body 10.

When the battery 130 is attached to the lower side of the main body 110, it is possible to improve driving stability. However, since the battery 130 is attached to the lower side of the main body 110, user inconvenience may be caused upon attaching the battery 130.

However, in a state in which the battery 130 is detached from the main body 110, the center of gravity of the main body 110 may be located at the front side of the vertical line passing through the center of the wheels 120. Therefore, when the battery 130 is detached from the main body 110, the main body 110 may be inclined to the front side of the wheels 120.

As the main body 110 is inclined forward, the front side of the bottom of the main body 110 contacts the floor. At this time, the battery attachment part 107 is inclined upward. Therefore, the user may easily attach the battery 130.

The battery 130 may be obliquely attached to the main body 110 by the attachment guide provided in the battery attachment part 107. More specifically, the insertion direction S of the battery 130 may form an acute angle with respect to the vertical direction V and the floor. Accordingly, when the front side of the bottom of the main body 110 contacts the floor, the insertion direction S of the battery 130 forms an acute angle with respect to the floor.

When the battery 130 is attached to the main body 110, the center of gravity of the main body 110 may move backward. That is, in a state in which the battery 130 is attached to the main body 110, the center of gravity of the main body 110 may be located at the back side of the vertical direction passing through the center of the wheels 120.

That is, when the battery 130 is attached to the main body 110, the main body 110 may be inclined to the back side of the wheels 120. At this time, the supporter 140 may selectively contact the floor. At this time, the bottom B of the main body 110 forms a predetermined angle θ with respect to the floor G.

Figure 11:
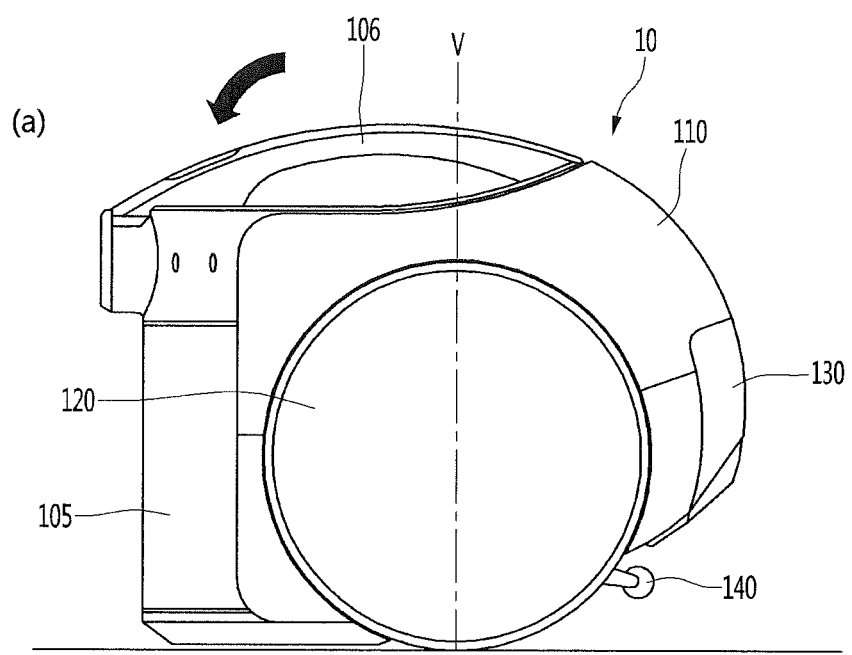
FIG. 11 is a view sequentially showing a state of detaching a battery from the main body of the cleaner.
Figure 11:
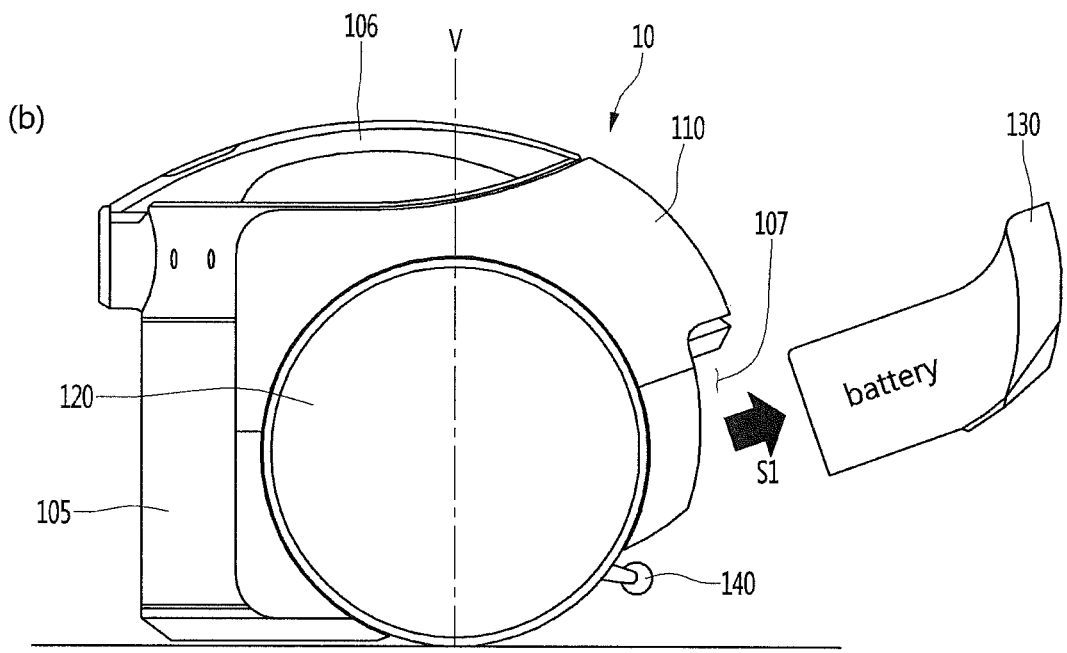

FIG. 11 is a view sequentially showing a state of detaching a battery from the cleaner body of the cleaner.

More specifically, (a) of FIG. 11 shows a state before the battery 130 is detached from the main body and (b) of FIG. 11 is a state after the battery 130 is detached from the main body 110.

In order to detach the battery 130 from the main body 110, the user may directly apply force to the main body 110 to incline the main body 110 forward. Next, the user may detach the battery 130 in a direction opposite to the insertion direction S. The user may grip the grip part 106 and then apply force forward in order to incline the main body 110 forward.

When the battery 130 is detached from the main body 110, the center of gravity of the main body 110 moves forward. Therefore, the main body 110 may be maintained in a forward inclined state.

In the vacuum cleaner 1 of the present invention, in the state in which the battery 130 is mounted in the main body 110, the main body 110 rotates backward such that the bottom of the main body 110 is separated from the floor. That is, the main body 110 may be two-point supported by the wheels 120. In this case, since the cleaner body 10 easily passes an obstacle and friction applied to the wheels 120 is reduced, it is possible to reduce user labor required to move the main body 10.

When the battery 130 is detached from the main body 110, the center of gravity of the main body 110 moves forward to rotate forward and thus the battery attachment part 107 provided at the lower back side of the main body 110 is raised. Therefore, the user can easily attach the battery 130 to the battery attachment part 107.

What is claimed is:

1. A vacuum cleaner comprising:
    a suction part that is configured to receive dust; and
    a cleaner body that is coupled to the suction part, that is configured to collect dust from the suction part based on suction force, and that includes:
        a main body,
        a suction motor that is configured to generate suction force,
        a wheel that is coupled to a first surface of the main body and that is configured to rotate about an axis to move the main body,
        a driving unit that is configured to generate driving force to move the wheel,
        a display unit that is coupled to the wheel and that is configured to display operation state information of the vacuum cleaner, and
        a controller that is configured to control the driving unit and the display unit.

2. The vacuum cleaner of claim 1, further comprising:
    a first sensor that is configured to sense movement of the main body,
    wherein the controller is configured to control a rotation of the wheel based on the movement of the main body sensed by the first sensor.

3. The vacuum cleaner of claim 2, wherein the controller is configured to:
    control the display unit to display power status of the first sensor.

4. The vacuum cleaner of claim 2, wherein the controller is configured to:
    control the display unit to display a rotation direction of the wheel.

5. The vacuum cleaner of claim 1, wherein the display unit includes:
    a light emitting unit that is configured to emit light, and
    wherein the controller is configured to:
        define a first region of the light emitting unit and control the first region of the light emitting unit to emit first light in a first color, and
        define a second region of the light emitting unit and control the second region of the light emitting unit to emit second light in a second color.

6. The vacuum cleaner of claim 5, wherein the light emitting unit has a circular shape or a ring shape, and wherein the controller is configured to:
    define the first region to move along a perimeter of the light emitting unit based on a rotation of the wheel.

7. The vacuum cleaner of claim 1, wherein the controller is configured to:
    determine whether the vacuum cleaner has an operation error, and
    based on a determination that the vacuum cleaner has an operation error, control the display unit to display the operation error.

8. The vacuum cleaner of claim 1, further comprising:
    a second sensor that is configured to sense an obstacle,
    wherein the controller is configured to control the display unit to display obstacle information indicating that an obstacle is present adjacent to the vacuum cleaner.

9. The vacuum cleaner of claim 1, further comprising:
    a battery that is configured to supply electric power to the main body,
    wherein the controller is configured to control the display unit to display battery level information including a remaining capacity of the battery.

10. The vacuum cleaner of claim 9, wherein the battery is detachable to the main body.

11. The vacuum cleaner of claim 10, wherein the cleaner body includes:
    a first portion located at a first side of the axis, and
    a second portion located at a second side of the axis,
    wherein the battery is detachable from the second portion of the cleaner body, and
    wherein, based on the battery being detached from the second portion, the second portion is heavier than the first portion.

12. The vacuum cleaner of claim 11, wherein, based on the battery being detached from the second portion, the first portion is lifted from ground.

13. The vacuum cleaner of claim 11, wherein at least a portion of the battery is closer to ground than the axis.

14. The vacuum cleaner of claim 11, wherein the main body includes:
    a battery attachment part that is part of the second portion and to which the battery is attached, and
    wherein the battery is attached to the battery attachment part at a first angle relative to ground, the first angle being between 0 and 90 degrees.

15. The vacuum cleaner of claim 11, further comprising:
    a supporter that is coupled to a surface of the main body,
    wherein the main body is configured to rotate about the axis based on the battery being detached from the second portion, and
    wherein the supporter is configured to block the main body from rotating beyond a second angle.

16. The vacuum cleaner of claim 15, wherein the supporter includes:
    an auxiliary wheel that is configured to rotate with the wheel.

17. The vacuum cleaner of claim 16, wherein the supporter includes:
    an extension that couples the auxiliary wheel to the main body.

18. The vacuum cleaner of claim 17, wherein the supporter includes:
    an elastic member that is configured to provide elastic force to the extension.

19. The vacuum cleaner of claim 10, further comprising:
    a third sensor that is configured to sense movement of the cleaner body, wherein, based on movement of the cleaner body, the controller is configured to control the driving unit to move the wheel such that the cleaner body follows a user.

20. A method of displaying operation state information of a vacuum cleaner that includes a main body, a wheel that is coupled to a first surface of the main body and that is configured to rotate to move the main body, a driving unit that is configured to generate driving force to move the wheel, a display unit that is coupled to the wheel and that is configured to display operation state information of the vacuum cleaner, a controller that is configured to control the driving unit and the display unit, and a sensor that is configured to sense movement of the main body, the method comprising:

initiating, by the controller, an operation of the sensor;
sensing, by the sensor, movement of the main body;
controlling, by the controller, the driving unit to move the wheel to move the main body; and
controlling, by the controller, the display unit to display a rotation direction of the wheel.

\* \* \* \* \*